United States Patent
Hsu et al.

(10) Patent No.: US 7,513,336 B2
(45) Date of Patent: Apr. 7, 2009

(54) LUBRICATING DEVICE FOR A LINEAR GUIDEWAY

(75) Inventors: Hsin-Tsun Hsu, Taichung (TW); Min-Yao Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 691 days.

(21) Appl. No.: 11/182,451

(22) Filed: Jul. 15, 2005

(65) Prior Publication Data
US 2007/0012516 A1    Jan. 18, 2007

(51) Int. Cl.
*F16N 1/00* (2006.01)
*F16C 17/00* (2006.01)
*F16C 21/00* (2006.01)
*F16C 43/00* (2006.01)

(52) U.S. Cl. .................... 184/5; 184/2; 184/3.1; 184/3.2

(58) Field of Classification Search ............ 184/5, 184/2, 3.1, 3.2, 21, 22; 384/13, 15; 508/110; 401/100
See application file for complete search history.

(56) References Cited

U.S. PATENT DOCUMENTS

| | | | | |
|---|---|---|---|---|
| 2,980,942 | A * | 4/1961 | Dabney, Jr. ............. | 401/10 |
| 5,547,285 | A * | 8/1996 | Hutzel et al. ............ | 384/15 |
| 5,678,927 | A * | 10/1997 | Yabe et al. ............. | 384/13 |
| 6,082,899 | A * | 7/2000 | Suzuki et al. ........... | 384/13 |
| 6,119,813 | A * | 9/2000 | Yabe et al. ............. | 184/5 |
| 6,257,766 | B1 * | 7/2001 | Agari .................. | 384/45 |
| 6,550,968 | B2 * | 4/2003 | Tsukada et al. ......... | 384/15 |
| 6,672,764 | B2 * | 1/2004 | Tsukada et al. ......... | 384/15 |
| 2002/0134622 | A1 * | 9/2002 | Michioka et al. ........ | 184/5 |
| 2004/0029740 | A1 * | 2/2004 | Yatsushiro et al. ...... | 508/110 |
| 2004/0211627 | A1 * | 10/2004 | Kuo et al. .............. | 184/5 |
| 2006/0054403 | A1 * | 3/2006 | Lacerda et al. ......... | 184/3.2 |

* cited by examiner

*Primary Examiner*—Robert A Siconolfi
*Assistant Examiner*—Thomas W Irvin

(57) ABSTRACT

A lubricating device for a linear guideway, used at either side of the slide block of a linear guideway, comprises: a housing, oil-containing member, magnets and metallic magnetic members. Using a magnetic force to push the oil-containing member against the rail, the magnetic force will not fatigue but will increase with the reduction in distance between the magnets and the metallic magnetic members, therefore, the oil-containing member can be kept in a good contact with the rolling passage of the rail, and the lubricating oil can be continuously transmitted from the oil-containing member to the surface of the rail, thus lubricating the linear guideway automatically without disassembling it.

6 Claims, 6 Drawing Sheets

LUBRICATING DEVICE FOR A LINEAR GUIDEWAY

BACKGROUND OF THE INVENTION

1. Field of the Invention

The present invention relates to a lubricating device for a linear guideway, and more particularly to a lubricating device for a linear guideway whose oil-containing member can maintain an all-the-time effective contact with the rail even after wear and tear.

2. Description of the Prior Art

With the development of science and technology, and the improvement of the precision feeding system, linear guideway and technology thereof have become a most important part of many precision mechanisms. Various types of linear mechanisms have been and are being widely used in different fields. Although the linear guideway technology is developing fast, still there are some problems of the linear products that need to be improved. Many efforts have been made by the related industry to effectively improve the quality of linear guideway, in particularly, those high precision mechanisms (such as wafer processing equipment and CNC Computer Numeric Control instruments) that need to run stably and silently. Therefore, there are still some blind spots in the existing linear mechanisms that need to be exploited and erased.

Most of the existing linear guideways are provided at both sides of the slide block thereof with oil tanks in which is received an oil-containing sponge. The oil-containing sponge will wear out after long time of use, so that a clearance will appear between the sponge and the rail of the linear guideway, and it will prevent the lubricating oil from reaching the linear guideway. Therefore, many linear products have been developed to solve this problem, they generally includes the following three types:

First, arranging a spring in the oil tanks and using it to push the oil-containing sponge against the rail, but the shortcoming is too complicated in structure and not easy for assembly. In addition, the spring will become loose with the wear of the oil-containing sponge and also because of the elastic fatigue of the spring itself (such as the device of U.S. Pat. No. 5,547,285).

Second, arranging a reverse U-shaped elastic piece in the oil tanks and using it to push the oil-containing sponge against the rail, but the shortcoming is, like the previous one, that the spring will become loose with the wear of the oil-containing sponge and also because of the elastic fatigue of the spring itself (such as the device of U.S. Pat. No. 6,672,764).

Third, arranging an elastic rubber in the oil tanks and using it to push the oil-containing sponge against the rail, but it still has the same shortcoming as the previous two.

The present invention has arisen to mitigate and/or obviate the afore-described disadvantages.

SUMMARY OF THE INVENTION

The primary objective of the present invention is to provide a lubricating device for a linear guideway whose oil-containing member can maintain an effective contact with the rail even after wear and tear. The present invention uses a magnetic force to push the oil-containing member against the rail, the magnetic force will not fatigue but will increase with the reduction in distance between the magnets and the metallic magnetic members, therefore, the oil-containing member can be all-the-time kept in a good contact with the rolling passage of the rail.

The secondary objective of the present invention is to provide a lubricating device for a linear guideway that have simple structure and can be assembled easily and only consists of housing, oil-containing member and magnets.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
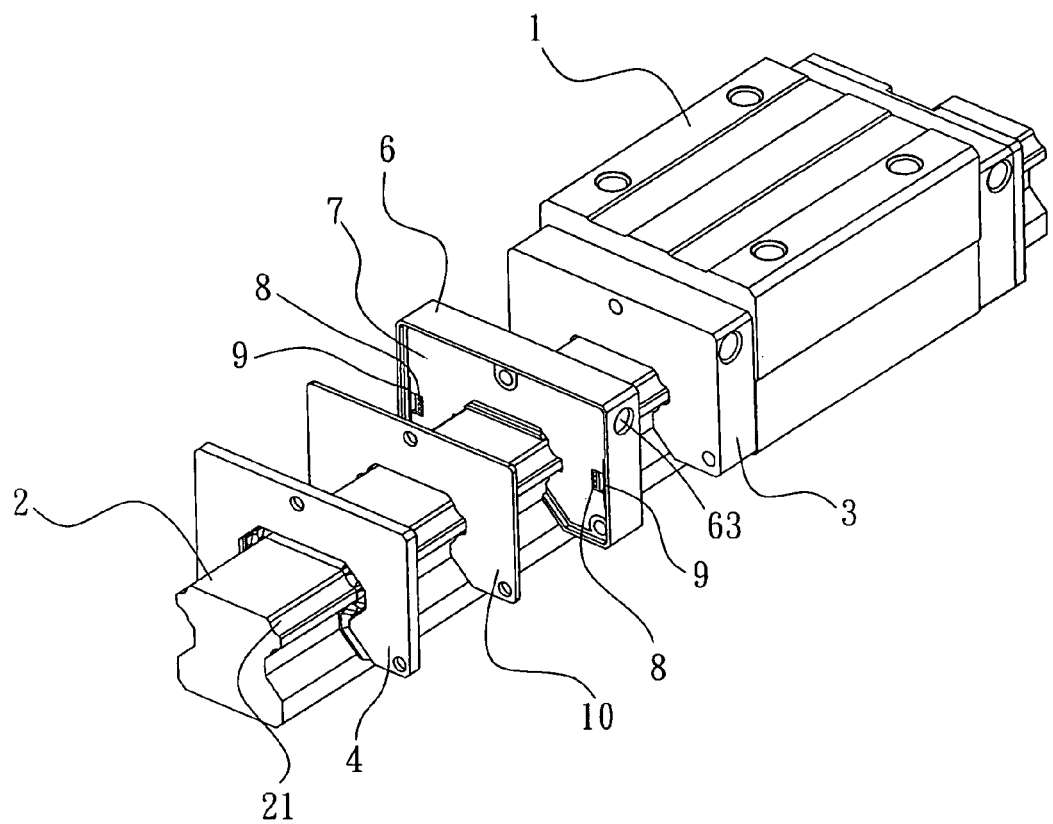
FIG. 1 is an exploded view of a linear guideway in accordance with a first embodiment of the present invention.
Figure 2:
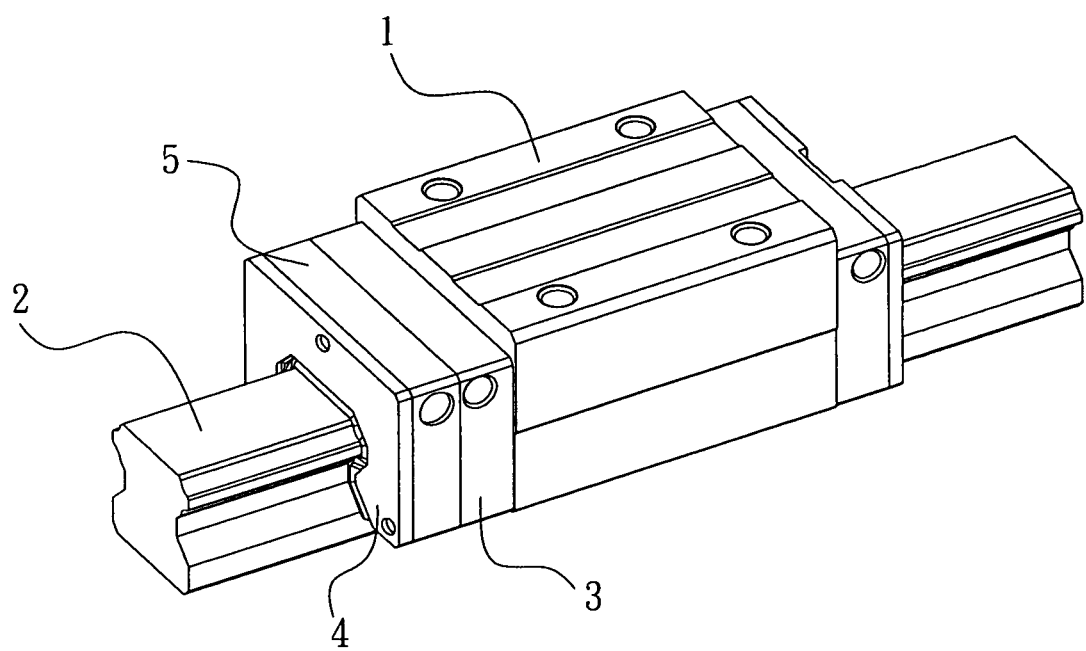
FIG. 2 is an assembly view of a linear guideway in accordance with the first embodiment of the present invention.

Referring to FIGS. 1 and 2, a linear guideway in accordance with a first embodiment of the present invention includes a slide block 1, a rail 2 with a rolling passage 21, a pair of end caps 3, a pair of oil scrapers 4, and two lubricating devices 5.

Each of the lubricating device 5 is fixed between the end cap 3 and the oil scraper 4 at either side of the slide block 1, and comprises a housing 6, an oil-containing member 7, a pair of magnets 8, a pair of metallic magnetic members 9 and a cover 10.

The housing 6 cooperate with the cover 10 to define an assembly space 61. On a lateral surface of the housing 6 is defined an oil feeding hole 63, the assembly space 61 has a notch 64 formed correspondingly to the rail 2, and in the assembly space 61 are arranged a pair of positioning protrusions 65 that each has a groove 62 facing the rail 2. The grooves 62 are opposite each other and located a certain distance away from the inner wall of the assembly space 61.

The oil-containing member 7 is a sponge received in the assembly space 61 and is formed with a pair of grooves 72 for mating with the grooves 62 of the positioning protrusions 65. A pair of inwardly extending protrusions 71 formed on the oil-containing member 7 extends into the notch 64 of the assembly space 61 and comes into effective contact with the rolling passage 21 of the rail 2. Outside the grooves 72 are formed a pair of recesses 73 that face the inner wall of the assembly space 61.

The magnets 8 are received in the grooves 62 of the positioning protrusions 65.

The metallic magnetic members 9 are received in the recesses 73 at both lateral surfaces of the oil-containing member 7 and are attracted by the magnets 8 in the grooves 62.

Figure 3:
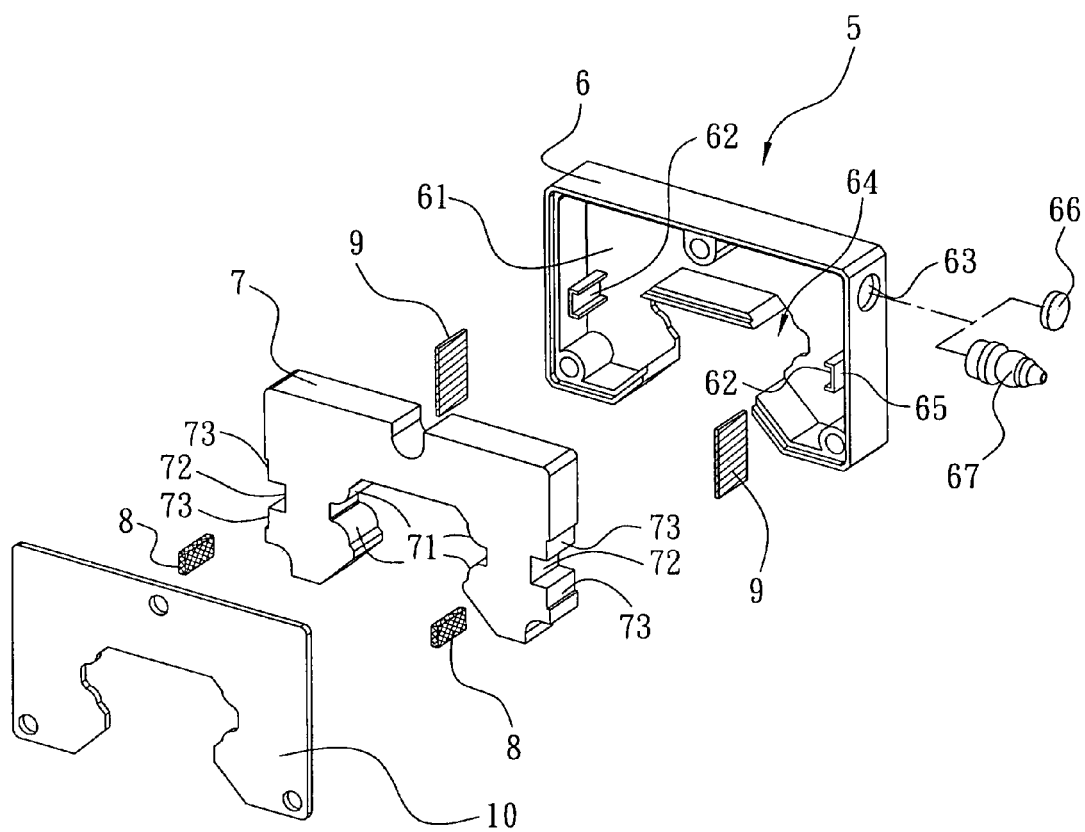
FIG. 3 is an exploded view of showing a lubricating device in accordance with the first embodiment of the present invention.
Figure 4:
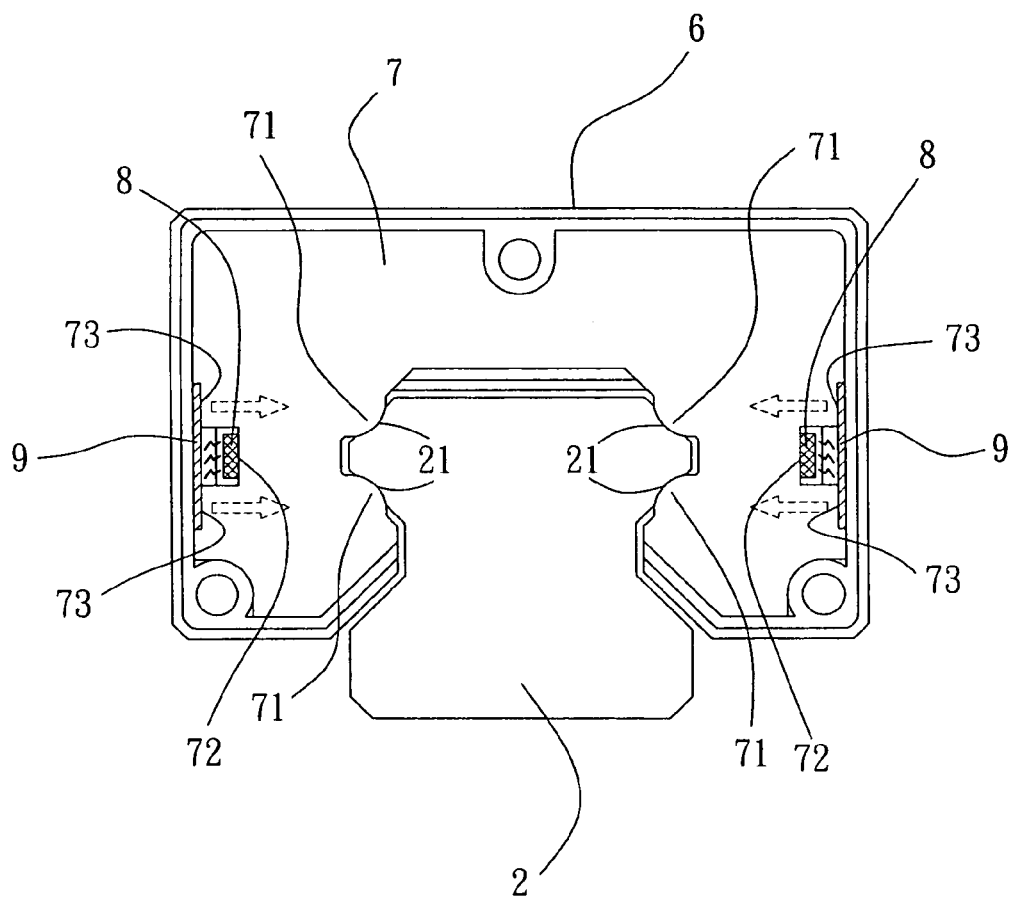
FIG. 4 is a cross sectional view of showing the lubricating device in accordance with the first embodiment of the present invention.

For a better understanding of the present invention, its operations and functions, references should be made to FIGS. 3 and 4. The magnets 8 will generate a magnetic force to the metallic magnetic members 9 in the recesses 73 at both lateral surfaces of the oil-containing member 7, pulling the metallic magnetic members 9 toward the rolling passage 21 of the rail 2. Consequently, the metallic magnetic members 9 will push the oil-containing member 7 against the rail 2, enabling the protrusions 71 of the oil-containing member 7 always to come into an effective contact with the rolling passage 21 of the rail 2 without being affected by the wear of the oil-containing member 7. The magnetic force between the magnets 8 and the metallic magnetic members 9 will not fatigue but will increase since the distance between the magnets 8 and the metallic magnetic members 9 will be reduced with the wear of the oil-containing member 7, therefore, the oil-containing member 7 can be all-the-time kept in a good contact with the rolling passage 21 of the rail 2.

The cover 10 will be covered on the longitudinal mouth of the housing 6 relative to the rail 2.

The oil-containing member 7 can be made of porous material, such as wool felt and foam material. The oil-feeding hole 63 of the lubricating device 5 can be sealed with plastic material 66, and a needle or oil nozzle 67 can be used to feed oil into the oil-feeding hole 63 by puncturing the plastic material directly.

Figure 5:
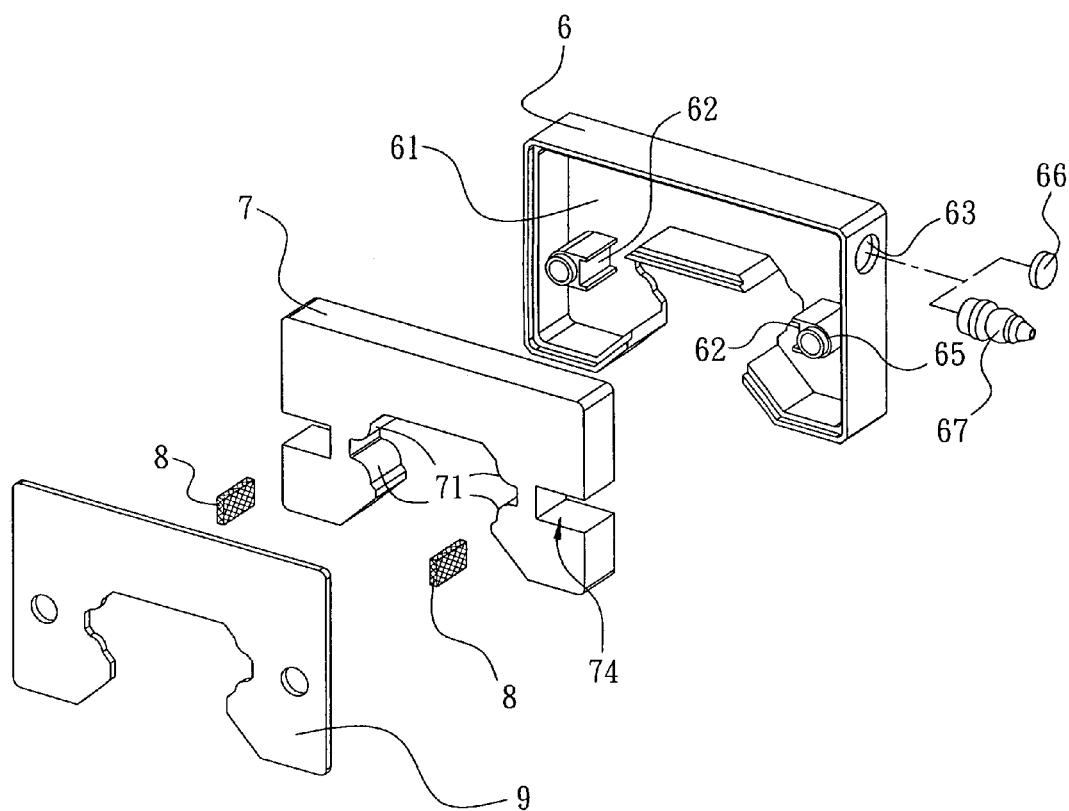
FIG. 5 is an exploded view of showing a lubricating device in accordance with a second embodiment of the present invention.
Figure 6:
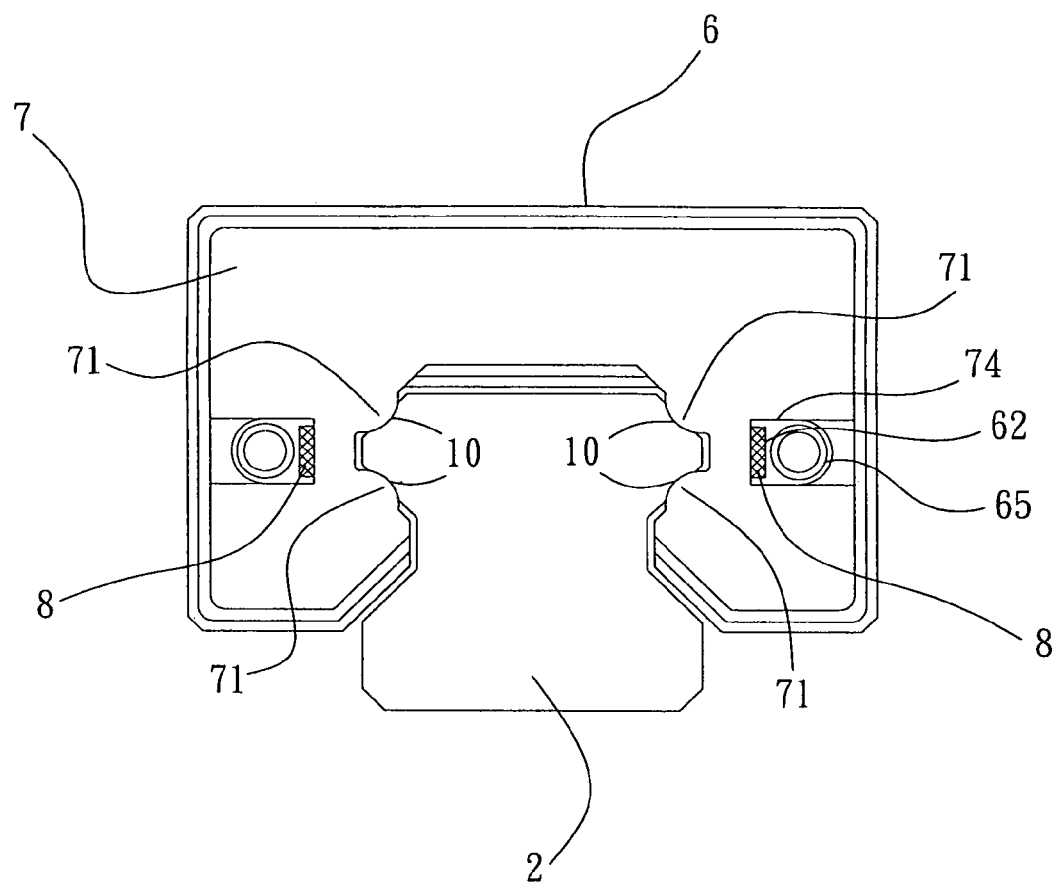
FIG. 6 is a cross sectional view of showing the lubricating device in accordance with the second embodiment of the present invention.

Referring to FIGS. 5 and 6, which show another embodiment of the present invention, wherein the metallic magnetic members 9 is replaced by the metal rail 2, and the magnets 8 are received in a deep recess 74 at either lateral surface of the oil-containing member 7. The recesses 74 are deep and located close to the metal rail 2 such that the magnets 8 can generate a magnetic force directly to the rail 2 for pushing the oil-containing member 7. The grooves 62 of the positioning protrusions 65 can limit the displacement of the magnets 8. This embodiment has the same function as the first embodiment but is simpler in structure.

While we have shown and described various embodiments in accordance with the present invention, it should be clear to those skilled in the art that further embodiments may be made without departing from the scope of the present invention.

What is claimed is:

1. A lubricating device for a linear guideway comprising:
    a housing, an oil-containing member, metallic magnetic members and magnets, wherein the magnets are disposed at either side of the oil-containing member and can generate a magnetic force, enabling the oil-containing member to come into an effective contact with a rail of the linear guideway;
    wherein the housing has an assembly space in which are arranged a plurality of positioning protrusions each having a groove facing the rail, and the groove is located a predetermined distance away from an inner wall of the assembly space;
    the oil-containing member is received in the assembly space and is formed with groove for mating with the groove of the positioning protrusions, a pair of inwardly extending protrusions formed on the oil-containing member extends into effective contact with a rolling passage of the rail, outside the grooves of the oil-containing member are formed a pair of recesses that face the inner wall of the assembly space;
    the magnets are received in the groove of the respective positioning protrusions; and
    the metallic magnetic members are received in the recesses at both lateral surfaces of the oil-containing member and are attracted by the magnets in the grooves of the respective positioning protrusions.

2. The lubricating device for a linear guideway as claimed in claim 1 is disposed between an end cap and an oil scraper at either end of a slide block of the linear guideway, the lubricating device further comprises a cover to be covered on the housing, on a side of the housing is formed an oil feeding hole, and the assembly space has a notch formed correspondingly to the rail.

3. The lubricating device for a linear guideway as claimed in claim 1, wherein the oil-containing member is wool felt.

4. The lubricating device for a linear guideway as claimed in claim 1, wherein the oil-containing member is a sponge.

5. The lubricating device for a linear guideway as claimed in claim 2, wherein the oil-feeding hole of the lubricating device is sealed with plastic material, and user can use a needle to puncture the plastic material and feed oil into the oil-feeding hole.

6. The lubricating device for a linear guideway as claimed in claim 2, wherein the oil-feeding hole of the lubricating device is equipped with an oil nozzle.

* * * * *